United States Patent
Yamanaka et al.

(10) Patent No.: US 7,688,204 B2
(45) Date of Patent: Mar. 30, 2010

(54) DOUBLE-ELECTRODE CAPACITIVE SENSOR, PASSENGER DETECTOR, AND PASSENGER PROTECTION SYSTEM

(75) Inventors: Shoichi Yamanaka, Anjo (JP); Tsutomu Kamizono, Nagoya (JP)

(73) Assignee: Denso Corporation, Kariya (JP)

( * ) Notice: Subject to any disclaimer, the term of this patent is extended or adjusted under 35 U.S.C. 154(b) by 299 days.

(21) Appl. No.: 12/008,966

(22) Filed: Jan. 15, 2008

(65) Prior Publication Data

US 2008/0186192 A1  Aug. 7, 2008

(30) Foreign Application Priority Data

Feb. 7, 2007  (JP)  ............... 2007-028548

(51) Int. Cl.
*G08B 13/26* (2006.01)
(52) U.S. Cl. ............. 340/562; 340/667; 324/686; 180/273; 73/862.337
(58) Field of Classification Search ............. 340/562, 340/545.4, 665, 666, 667, 561, 438; 307/10.1; 701/45, 50; 180/271, 272, 273; 280/735; 73/862.337, 862.52, 862.391; 324/658, 686
See application file for complete search history.

(56) References Cited

U.S. PATENT DOCUMENTS

| | | | |
|---|---|---|---|
| 6,283,504 B1 | 9/2001 | Stanley et al. | 280/735 |
| 6,329,913 B1 | 12/2001 | Shieh et al. | 340/561 |
| 6,329,914 B1 | 12/2001 | Shieh et al. | 340/561 |
| 6,348,862 B1 | 2/2002 | McDonnell et al. | 340/562 |
| 6,378,900 B1 | 4/2002 | Stanley et al. | 280/735 |
| 6,392,542 B1 | 5/2002 | Stanley | 340/561 |
| 6,445,294 B1 | 9/2002 | McDonnell et al. | 340/562 |
| 6,476,620 B2 * | 11/2002 | Kato et al. | 324/662 |
| 6,517,106 B1 | 2/2003 | Stanley et al. | 280/735 |
| 6,520,535 B1 | 2/2003 | Stanley et al. | 280/735 |
| 6,563,231 B1 | 5/2003 | Stanley et al. | 307/10.1 |
| 6,577,023 B1 | 6/2003 | Stanley et al. | 307/10.1 |
| 6,598,900 B2 | 7/2003 | Stanley et al. | 280/735 |

(Continued)

FOREIGN PATENT DOCUMENTS

JP  11-268607  10/1999

(Continued)

OTHER PUBLICATIONS

Office action dated Jan. 13, 2009 in Japanese Application No. 2007-028548.

*Primary Examiner*—Toan N Pham
(74) *Attorney, Agent, or Firm*—Harness, Dickey & Pierce, PLC

(57) ABSTRACT

A double-electrode capacitive sensor for detecting a detection object includes: an electrode assembly having first and second electrodes and an insulation substrate; and a detection circuit. The first and second electrodes are disposed on first and second surfaces of the substrate, respectively. The detection circuit applies an alternating voltage between a ground and the first electrode, and detects an electric potential of the second electrode, or controls the electric potential of the second electrode to follow the alternating voltage. The detection circuit detects a capacitance change between the first electrode and the ground when the detection object approaches the first electrode for determining whether the detection object approaches the first electrode. A periphery of the second electrode is substantially opposite to a periphery of the first electrode.

8 Claims, 14 Drawing Sheets

U.S. PATENT DOCUMENTS

| | | | |
|---|---|---|---|
| 6,707,306 B1 * | 3/2004 | Wendt | 324/662 |
| 6,825,765 B2 | 11/2004 | Stanley et al. | 340/561 |
| 7,180,306 B2 | 2/2007 | Stanley et al. | 324/686 |
| 7,469,594 B2 * | 12/2008 | Jitsui et al. | 73/779 |
| 7,497,465 B2 * | 3/2009 | Wato et al. | 280/735 |
| 7,598,881 B2 * | 10/2009 | Morgan | 340/667 |
| 2001/0045733 A1 | 11/2001 | Stanley et al. | 280/735 |
| 2006/0164254 A1 | 7/2006 | Kamizono et al. | 340/667 |
| 2007/0159178 A1 | 7/2007 | Stanley et al. | 324/457 |

FOREIGN PATENT DOCUMENTS

| | | |
|---|---|---|
| JP | 2000-028309 | 1/2000 |
| JP | 2006-133029 | 5/2006 |

* cited by examiner

DOUBLE-ELECTRODE CAPACITIVE SENSOR, PASSENGER DETECTOR, AND PASSENGER PROTECTION SYSTEM

CROSS REFERENCE TO RELATED APPLICATION

This application is based on Japanese Patent Application No. 2007-28548 filed on Feb. 7, 2007, the disclosure of which is incorporated herein by reference.

FIELD OF THE INVENTION

The present invention relates to a double-electrode capacitive sensor, a passenger detector, and a passenger protection system.

BACKGROUND OF THE INVENTION

JP-A-2006-201129 corresponding to US Patent Application Publication No. 2006-164254 proposes a vehicular seating detection sensor using a double-electrode capacitance sensor having an electrode assembly in which a front electrode is provided on the front major surface of a resin film buried in a seat, and a back electrode which is smaller than the front electrode is provided on the back major surface of the resin film. The double-electrode capacitance sensor also has a detection circuit section for detecting whether someone is seated or not using the electrode assembly.

The detection circuit section applies an AC voltage between one electrode and the vehicle body and supplies an AC current to the other electrode via an operational amplifier so that the potential of the other electrode becomes equal to that of the one electrode. The detection circuit section judges whether someone is seated or not on the basis of a variation of the AC current.

Although the above double-electrode capacitance sensor is higher in detection sensitivity than single-electrode capacitance sensors, there is a market requirement that its detection sensitivity be increased further.

SUMMARY OF THE INVENTION

In view of the above-described problem, it is an object of the present disclosure to provide a double-electrode capacitive sensor. It is another object of the present disclosure to provide a passenger detector. It is further another object of the present disclosure to provide a passenger protection system.

According to a first aspect of the present disclosure, a double-electrode capacitive sensor for detecting a detection object made of dielectric material includes: an electrode assembly having a first electrode, a second electrode and an insulation substrate; and a detection circuit electrically coupled with the first and second electrodes. The first electrode faces the detection object. The first and second electrodes are overlapped, and the second electrode is coupled with a ground. The insulation substrate has a first surface and a second surface. The first electrode is disposed on the first surface, and the second electrode is disposed on the second surface, so that the second electrode faces the first electrode in parallel to the first electrode through the insulation substrate. The detection circuit applies an alternating voltage between the ground and one of the first and second electrodes. The detection circuit detects an electric potential of the other one of the first and second electrodes, or controls the electric potential of the other one of the first and second electrodes to follow the alternating voltage of the one of the first and second electrodes. The detection circuit detects a capacitance change between the first electrode and the ground when the detection object approaches the first electrode. The detection circuit determines whether the detection object approaches the first electrode based on the capacitance change. The second electrode has a periphery, which is substantially opposite to a periphery of the first electrode.

In the above sensor, since the periphery of the second electrode is opposite to the periphery of the first electrode, detection accuracy of the detection object is improved.

According to a second aspect of the present disclosure, a double-electrode capacitive sensor for detecting a detection object made of dielectric material includes: an electrode assembly having a first electrode, a second electrode and an insulation substrate; and a detection circuit electrically coupled with the first and second electrodes. The first electrode faces the detection object. The first and second electrodes are overlapped, and the second electrode is coupled with a ground. The insulation substrate has a first surface and a second surface. The first electrode is disposed on the first surface, and the second electrode is disposed on the second surface, so that the second electrode faces the first electrode in parallel to the first electrode through the insulation substrate. The detection circuit applies an alternating voltage between the ground and one of the first and second electrodes. The detection circuit detects an electric potential of the other one of the first and second electrodes, or controls the electric potential of the other one of the first and second electrodes to follow the alternating voltage of the one of the first and second electrodes. The detection circuit detects a capacitance change between the first electrode and the ground when the detection object approaches the first electrode. The detection circuit determines whether the detection object approaches the first electrode based on the capacitance change. The detection circuit includes an oscillation circuit and a differential amplifier circuit. The oscillation circuit applies the alternating voltage between the ground and the one of the first and second electrodes. The differential amplifier circuit alternatingly energizes the other one of the first and second electrodes so that the electric potential of the other one of the first and second electrodes follows the electric potential of the one of the first and second electrodes. The differential amplifier outputs a signal corresponding to an energizing current to the other one of the first and second electrodes. The differential amplifier includes a voltage follower circuit for energizing the other one of the first and second electrodes with the electric potential of the other one of the first and second electrodes.

In the above sensor, the following performance of the electric potential is improved, and oscillation of the differential amplifier circuit is prevented. Thus, a usable frequency of the sensor can be increased.

According to a third aspect of the present disclosure, a passenger detector includes: the double-electrode capacitive sensor according to the first aspect. The double-electrode capacitive sensor is mounted on a seat of a vehicle. The detection object is a passenger in the vehicle so that the detection circuit determines whether the passenger sits down on the seat based on the capacitance change. The detection circuit further identify the passenger based on the capacitance change.

In the above detector, detection accuracy of the passenger is improved.

According to a fourth aspect of the present disclosure, a passenger protection system includes: the passenger detector according to the third aspect; a passenger protection device for protect the passenger in case of collision of the vehicle;

and a controller for controlling the passenger protection device based on determination of the passenger detector.

In the above system, the passenger can be protected with much safer.

According to a fifth aspect of the present disclosure, a double-electrode capacitive sensor for detecting a detection object made of dielectric material includes: an electrode assembly having a first electrode, a second electrode and an insulation substrate; and a detection circuit electrically coupled with the first and second electrodes. The insulation substrate has a first surface and a second surface. The first electrode is disposed on the first surface, and the second electrode is disposed on the second surface. The first electrode faces the detection object. The first and second electrodes are overlapped so that a periphery of the second electrode is substantially opposite to a periphery of the first electrode. The second electrode is coupled with a ground. The detection circuit applies an alternating voltage between the ground and the second electrode. The detection circuit controls an electric potential of the first electrode to follow the alternating voltage. The detection circuit detects a capacitance change between the first electrode and the ground when the detection object approaches the first electrode. The detection circuit determines whether the detection object approaches the first electrode based on the capacitance change. The detection circuit includes an oscillation circuit and a differential amplifier circuit. The oscillation circuit applies the alternating voltage between the ground and the second electrode. The differential amplifier circuit alternatingly energizes the first electrode so that the electric potential of the first electrode follows the electric potential of the second electrode. The differential amplifier outputs a signal corresponding to an energizing current to the first electrode. The differential amplifier includes a voltage follower circuit for energizing the first electrode with the electric potential of the first electrode. A deviation between the periphery of the first electrode and the periphery of the second electrode is in a range between −10% and +10%.

In the above sensor, since the periphery of the second electrode is opposite to the periphery of the first electrode, detection accuracy of the detection object is improved. Further, the following performance of the electric potential is improved, and oscillation of the differential amplifier circuit is prevented. Thus, a usable frequency of the sensor can be increased.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A vehicular seating detection sensor using a double-electrode capacitance sensor according to a preferred embodiment will be hereinafter described. The double-electrode capacitance sensor can be used in seating detection sensors for uses other than the vehicular use and can be used broadly in industrial or home dielectric proximity sensors for detecting a proximate dielectric.

Figure 1:
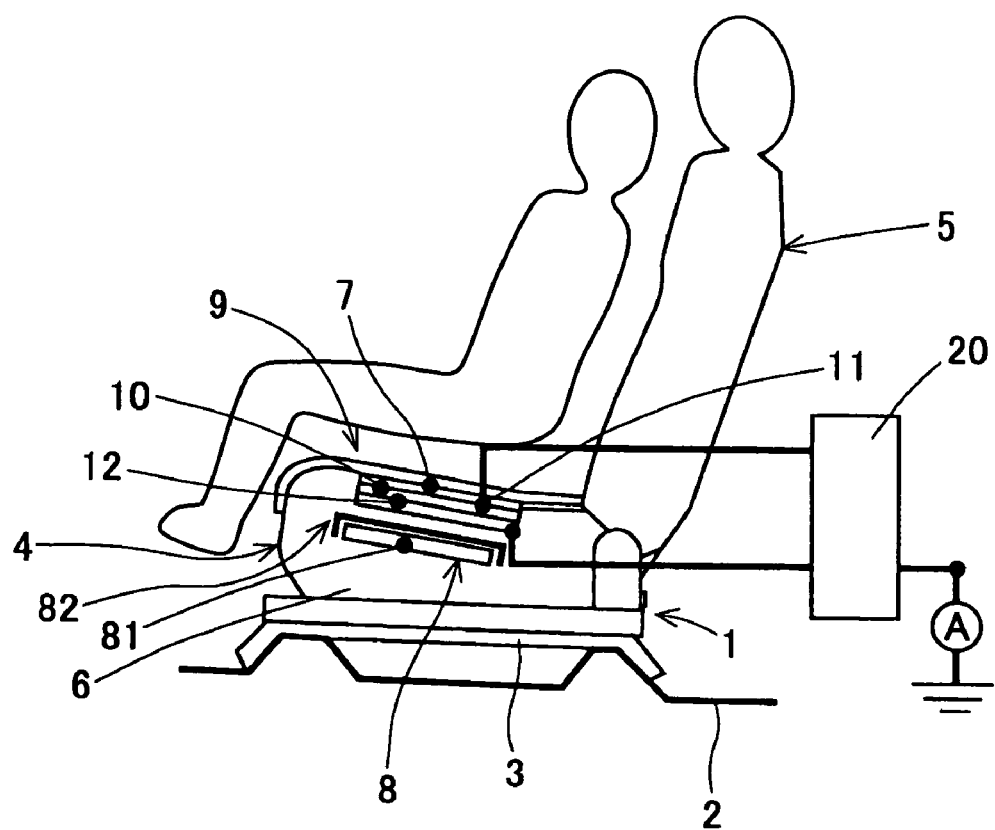
FIG. 1 is a schematic vertical sectional view of a vehicular seat apparatus according to an example embodiment of the present disclosure.
Figure 2:
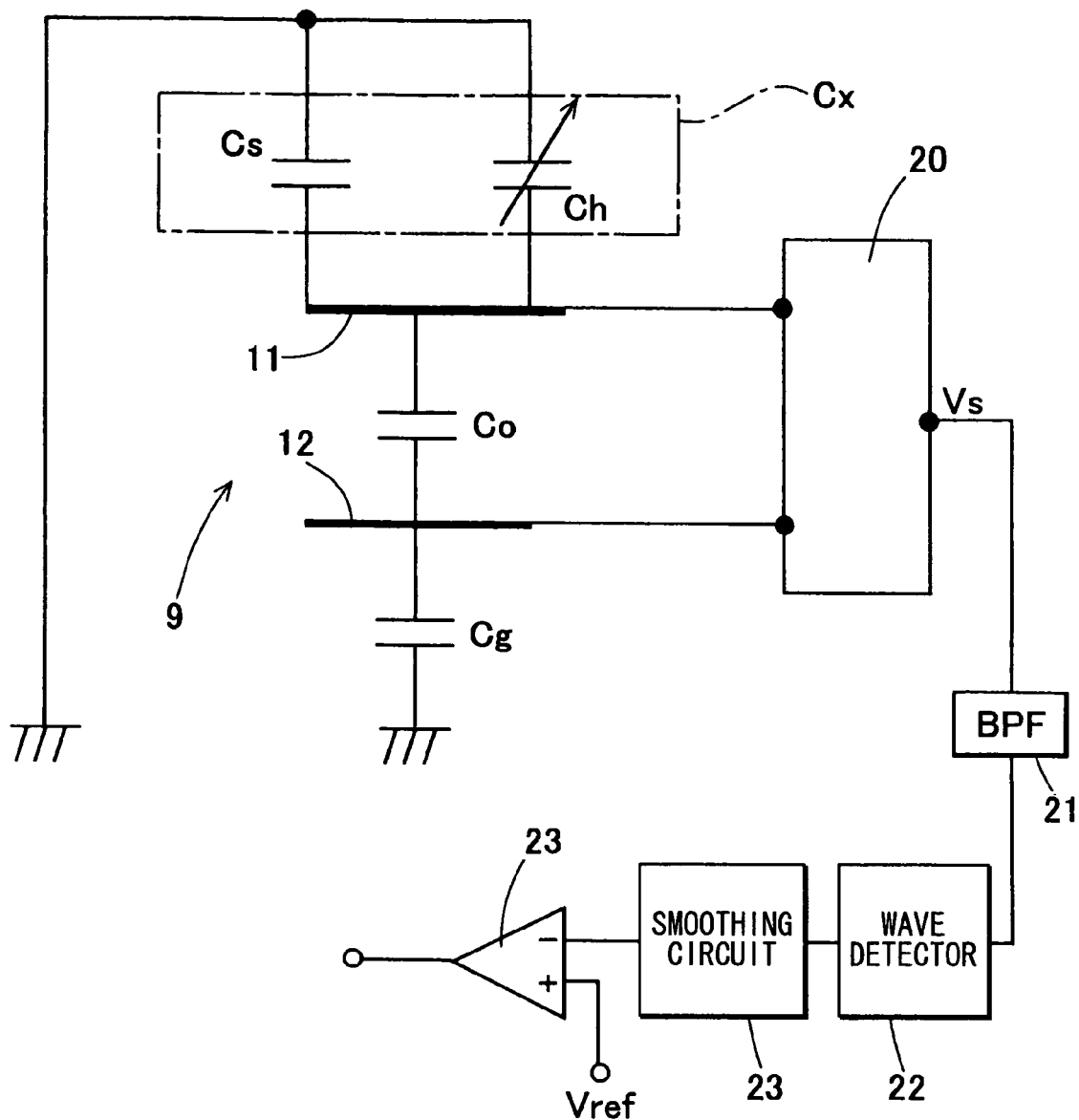
FIG. 2 is a circuit diagram of a seating detection apparatus using the double-electrode capacitance sensor shown in FIG. 1.

The embodiment will be described below with reference to FIGS. 1 and 2. FIG. 1 is a schematic vertical sectional view of a vehicular seat apparatus on which a passenger is seated.

Configuration of vehicular seat apparatus 1 will be explained as follows.

As shown in FIG. 1, a vehicular seat apparatus 1 is installed on a floor 2 of a vehicle body. The vehicular seat apparatus 1 is equipped with a metal frame 3 which is attached to the floor 2, a seat 4 which is a seating portion of the vehicular seat apparatus 1 and is fixed to the frame 3, and a seat back (backrest) 5 which erects obliquely upward (inclined backward) from the rear end of the seat 4.

The seat 4 is equipped with a cushion pad 6 which is mainly made of an elastic, electrically insulation material such as a hard polyurethane foam and is fixed to the frame 3, a cushion cover 7 which is mainly made of, for example, a beautiful electrically insulation material such as a woven cloth and covers the top surface (seat surface) of the cushion pad 6, a seat heater 8 which is disposed approximately parallel with the seat surface of the cushion pad 6, and a mat electrode assembly 9 as a seating detection electrode assembly which is interposed between the seat heater 8 and the cushion cover 7 and buried so as to be approximately parallel with the seat surface.

The seat heater 8 has a heater 81 and a waterproof film 82. The mat electrode assembly 9 has an electrically insulation resin film 10 having prescribed relative permittivity, a layer-like top electrode (corresponds to the term "front electrode" used in the claims) 11 extending so as to be in close contact with the top surface of the resin film 10, and a layer-like bottom electrode (corresponds to the term "back electrode" used in the claims) 12 extending so as to be in close contact with the bottom surface of the resin film 10. The top electrode 11 and the bottom electrode 12 are protected being covered with resin. The resin film 10, the top electrode 11, and the bottom electrode 12 can be realized by an ordinary flexible circuit board.

Circuit configuration will be explained as follows.

Next, the circuit configuration of the double-electrode capacitance sensor and the mat electrode assembly 9 will be described with reference to FIG. 2.

The two electrodes 11 and 12 are connected to a detection circuit section 20 (described later). The detection circuit section 20 incorporates an oscillation circuit which oscillates at a prescribed frequency f. The oscillation circuit applies an AC voltage to one of the electrodes 11 and 12. The detection circuit section 20 outputs a detection signal voltage Vs to a wave detector 22 via its output end and a band pass filter 21 which passes a signal having the above-mentioned frequency f. A wave-detected detection signal voltage Vs is smoothed by a smoothing circuit 23 and compared with a threshold voltage Vref by a comparator 24. A microcomputer (not shown) judges whether or not a passenger having very large relative permittivity is seated on the basis of a comparison result. Here, a passenger includes a driver and a person in a vehicle.

Capacitance equivalent circuit including electrodes 11 and 12 will be explained as follows.

An ideal equivalent circuit including the electrodes 11 and 12 will be described below with reference to FIG. 2.

Symbol Cg represents capacitance between the bottom electrode 12 and the combination of the heater 81 and the vehicle body (ground), Co represents capacitance between the top electrode 11 and the bottom electrode 12, and Cs represents capacitance between the top electrode 11 and the combination of the heater 81 and the vehicle body (ground). More specifically, Cs represents the capacitance between the top electrode 11 and the vehicle body (ground) in a state that no passenger is seated on the seat and Ch represents an increment of the capacitance between the top electrode 11 and the vehicle body (ground) due to seating of a passenger. Symbol Cx represents capacitance between the top electrode 11 and the ground which is the sum of Cs and Ch and varies depending on whether a passenger is seated.

To simplify the description, the resistances and the inductances of the interconnections and the electrodes will be omitted. And it is assumed that the capacitance Co between the top electrode 11 and the bottom electrode 12 and the capacitance Cg between the bottom electrode 12 and the ground are kept constant irrespective of whether a passenger is seated or not.

However, in actuality, the internal resistance of an oscillation circuit section and the frequency characteristic of an operational amplifier 200 need to be taken into consideration, and the resistances and the inductances of the interconnections and the electrodes are not negligible. Each of the capacitance Co and the capacitance Cg varies when a passenger is seated, that is, when a dielectric approaches the top electrode 11 directly from above. However, these variations are smaller than a variation of the capacitance Cx and hence can be disregarded in a circuit analysis.

Circuit example 1 of detection circuit section 20 will be explained as follows.

Circuit example 1 of the detection circuit section 20 will be described below in a specific manner with reference to a circuit diagram of FIG. 3. The circuit configuration of this detection circuit section 20 is described in the above-mentioned publication JP-A-2006-201129.

Reference numeral 200 denotes an operational amplifier and numeral 201 denotes its feedback resistor having a resistance value rf. They constitute a differential amplifier circuit section (this term is used in the claims). The top electrode 11 is connected to the inverting input end of the operational amplifier 200, and the bottom electrode 12 is connected to the non-inverting input end of the operational amplifier 200. Reference numeral 202 denotes an oscillation circuit section which oscillates at a prescribed frequency (preferably, several hundreds of hertz to several megahertz). The oscillation circuit section 202 having a low output impedance applies an AC voltage Vac between the bottom electrode 12 and the ground.

The operation of this circuit will be described below in detail. The two input ends of the operational amplifier 200 are imaginarily short-circuited and hence the potentials of the top electrode 11 and the bottom electrode 12 can be regarded as identical. This means that the operational amplifier 200 charges and discharges the detection subject capacitance Cx via the feedback resistor 201. Since the top electrode 11 and the bottom electrode 12 have the same potential, the operational amplifier 200 does not charge and discharge the capacitance Co. Since the capacitance Co is not charged and discharged, it can be considered that the oscillation circuit section 202 charges and discharges only the capacitance Cg.

That is, the AC current Ix flowing through the feedback resistor 201 and the capacitance Cx and the voltage drop Vs across the feedback resistor 201 are given by $$Ix = Vac/Zx$$

$$Vs = rf \times Ix = rf \times Vac/Zx$$
$$= -rf \times Vac \times j\omega Cx$$
$$= -rf \times Vac \times j\omega(Cs + Ch)$$
$$= -(rf \times Vac \times j\omega Cs + rf \times Vac \times j\omega Ch)$$
$$= -(V1 + rf \times Vac \times j\omega Ch)$$
$$= -(V1 + \Delta V)$$

Here, Vac is the output voltage of the oscillation circuit section 202, rf is the resistance of the feedback resistor 201, and Zx is the AC impedance of the capacitance Cx. Parameter V1=rf×Vac×jωCs and ΔV is the variation component of Vs that is caused by seating/non-seating.

It is seen from the above equations that if the voltage drop Vs across the feedback resistor 201 is regarded as a signal voltage, the signal voltage Vs varies in proportion to seating. It is important that the current Ix includes no parameter relating to the capacitance Cg between the bottom electrode 12 and the ground. Since the signal voltage Vs varies approximately in proportion to the capacitance variation Ch which is caused by seating/non-seating, high detection sensitivity can be expected.

It is seen that the absolute value of the variation component ΔV of the signal voltage Vs which is caused by seating/non-seating can be increased by increasing the resistance rf of the feedback resistor 201, the output voltage Vac of the oscillation circuit section 202, or its frequency f. However, this also increases the voltage V1 which is obtained when no passenger is seated. The resistance rf cannot be increased beyond a certain limit because the increase of the resistance rf causes deterioration of the phase characteristic etc. It should be noted that the above description is directed to the ideal case the internal resistance of the oscillation circuit section 202 is regarded as zero and the above-mentioned various parasitic impedances are ignored.

For example, although in the above description the capacitance Co between the two electrodes 11 and 12 is regarded as constant irrespective of seating/non-seating, it has been found that in actuality it varies depending on whether a passenger is seated or not because in particular the electric field lines extending from the top major surface of the top electrode 11 to the bottom major surface of the bottom electrode 12 occupy a wide space, and that this results in a problem that the signal voltage Vs is modulated and the detection sensitivity is lowered.

In the above embodiment, the operational amplifier 200 supplies AC current to the top electrode 11 via the feedback resistor 201 so that the two electrodes 11 and 12 have the same potential. A first important point of the detection circuit section 20 of FIG. 3 is that since the oscillation circuit section 202 supplies power to the parasitic capacitance Cg which is originally connected parallel with the detection subject capacitance Cx, it is sufficient for the operational amplifier 200 (which has a circuit function as a power supply circuit whose potential follows the potential of the oscillation circuit section 202) to supply power to only the detection subject capacitance Cx. This realizes sensitivity increase.

Figure 3:
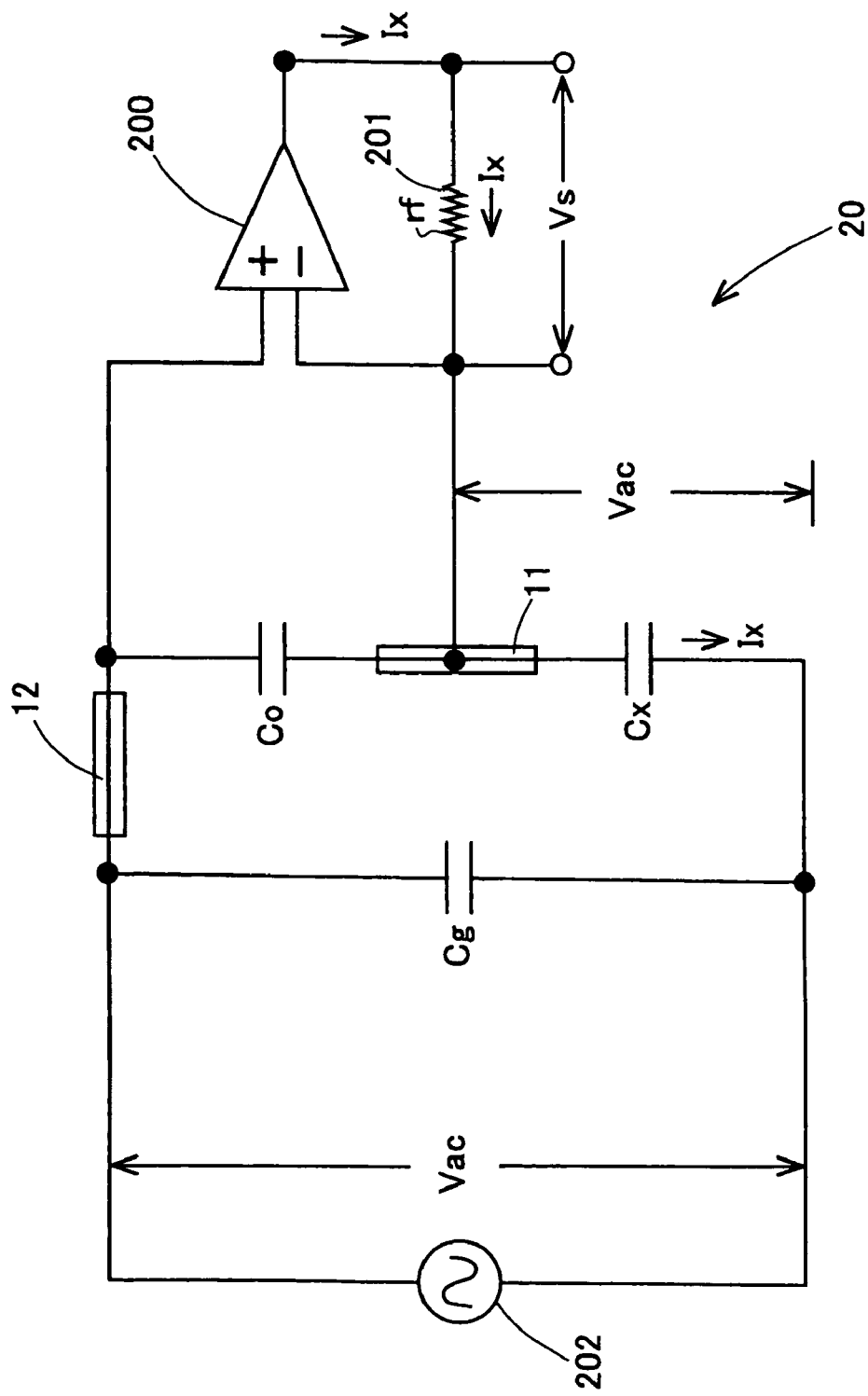
FIG. 3 is a circuit diagram of a circuit example of the detection circuit section shown in FIG. 2.

A second important point of the detection circuit section 20 of FIG. 3 is that the capacitance Co between the electrodes 11 and 12 should not be charged and discharged. It is understood that this requirement is satisfied by causing the potential of the top electrode 11 to follow a potential variation of the bottom electrode 12.

A modification of the circuit of FIG. 3 will be described below. This modification can also be made as appropriate in circuits of FIG. 4 onward.

In this modification, the two electrodes 11 and 12 have a DC potential difference. That is, the parasitic capacitance Cg can substantially be separated from the detection subject capacitance Cx by causing the potential of the operational-amplifier-200-side electrode to follow a potential variation of the oscillation-circuit-section-202-side electrode.

However, where the operational amplifier 200 is used as a differential amplifier circuit section, it is preferable to provide a passive element circuit upstream of the operational amplifier 200 so that the two input ends of the operational amplifier 200 are short-circuited imaginarily.

Circuit example 2 of detection circuit section 20 will be explained as follows.

Circuit example 2 of the detection circuit section 20 will be described below in a specific manner with reference to a circuit diagram of FIG. 4. This circuit example is such that the circuit of FIG. 3 is modified in such a manner that the oscillation circuit section 202 applies an AC voltage Vac to the top electrode 11 and an AC current Iy is fed back from the operational amplifier 200 to the bottom electrode 12 via the feedback resistor 201. The circuit configuration of this detection circuit section 20 is described in above-mentioned publication JP-A-2006-201129.

The operation of this circuit will be described below briefly. The two input ends of the operational amplifier 200 are imaginarily short-circuited and hence the potentials of the top electrode 11 and the bottom electrode 12 can be regarded as identical. This means that the operational amplifier 200 charges and discharges the capacitance Cg via the feedback resistor 201. Since the top electrode 11 and the bottom electrode 12 have the same potential, operational amplifier 200 does not charge and discharge the capacitance Co. Since the capacitance Co is not charged and discharged, it can be considered that ideally the oscillation circuit section 202 charges and discharges only the capacitance Cx.

Assume that ri represents the impedance from the output end of the oscillation circuit section 202 to the top electrode 11 (or the internal output resistance of the oscillation circuit section 202), Vac represents the output voltage of the oscillation circuit section 202, $\Delta V$ represents the voltage drop across the impedance ri, V2 represents the voltage drop across the capacitance Cx, Ix represents the current flowing through the impedance ri and the capacitance Cx, rf represents the resistance of the feedback resistor 201, Vs represents the output signal voltage of the operational amplifier 200, Zx represents the AC impedance of the capacitance Cx, and Iy represents the AC current flowing through the feedback resistor 201. The oscillation circuit section 202 charges and discharges the capacitance Cx by the current Ix, and the operational amplifier 200 charges and discharges the capacitance Cg via the feedback resistor 201 by the current Iy.

$\Delta V = ri \times Ix$ $Ix = Vac/(Zx+ri)$ $V2 = Vac - \Delta V$ $Vs = V2 - Iy \times rf$ $Iy = V2 \times j\omega Cg$ It is seen from the above equations that when the capacitance Cx varies, the voltage drop across the impedance ri varies and the potential of the top electrode 11 varies accordingly, as a result of which the output signal voltage Vs varies.

The above description assumes that the capacitance Cg between the bottom electrode 12 and the ground and the capacitance Co between the two electrodes 11 and 12 do not vary depending on whether a passenger is seated or not. However, as mentioned above, since electric field lines develop widely in a space around the two electrodes 11 and 12, the above parameters are not constant but vary in a strict sense. The output signal voltage Vs is thereby varied.

Circuit example 3 of detection circuit section 20 will be explained as follows.

Circuit example 3 of the detection circuit section 20 will be described below in a specific manner with reference to a circuit diagram of FIG. 5. This circuit is characterized in that the circuit of FIG. 3 is modified in such a manner that the feedback resistor 201 is omitted to make the differential amplifier circuit section a voltage follower circuit and that the output end of the differential amplifier circuit section is connected to the top electrode 11 by a current detection resistor 203 having a resistance value r.

The operation of this circuit will be described below. The two input ends of the operational amplifier 200 are imaginarily short-circuited and hence the potentials of the top electrode 11 and the bottom electrode 12 can be regarded as identical. The output voltage of the voltage follower circuit (i.e., the differential amplifier circuit section without the feedback resistor 201) can follow a potential variation of the bottom electrode 12 with a good phase characteristic to a high frequency range. That is, the operational amplifier 200 charges and discharges the capacitance Cx at high speed without intervention of the feedback resistor 201 shown in FIG. 3. An output signal voltage Vs is taken from the top electrode 11. This is equivalent to detection of a voltage drop across the current detection resistor 203.

Figure 5:
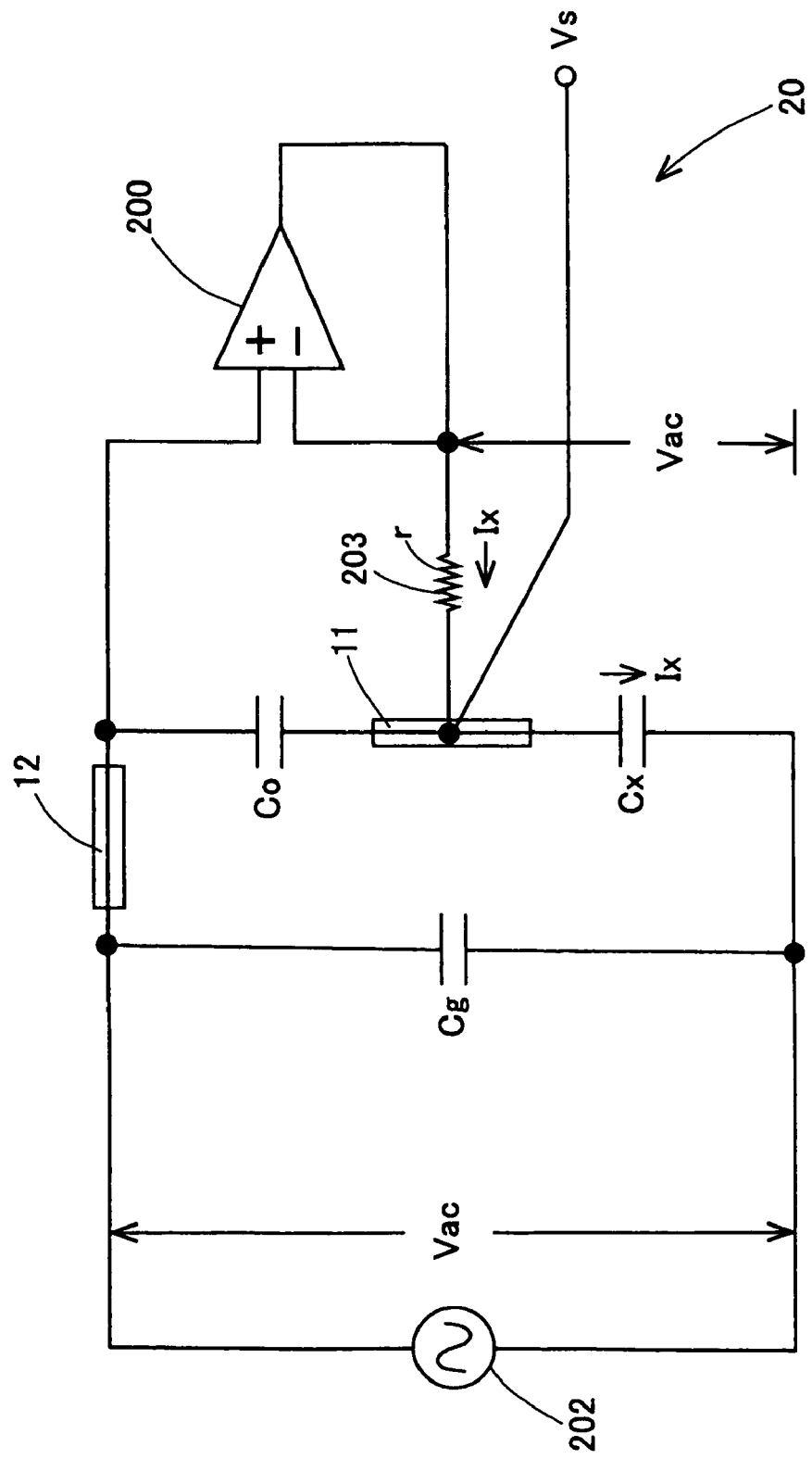
FIG. 5 is a circuit diagram of further another circuit example of the detection circuit section shown in FIG. 2.

In the circuit of FIG. 5, the following equation holds ideally:

$Ix = Vs/Zx = (Vac-Vs)/r$

It is seen from this equation that the output signal voltage Vs varies in link with the detection subject capacitance Cx.

Since the feedback resistor 201 is omitted, in the circuit of FIG. 5 the voltage across the capacitance Cx can follow a variation of the AC voltage Vac better than in the circuit of FIG. 3.

Circuit example 4 of detection circuit section 20 will be explained as follows.

Circuit example 4 of the detection circuit section 20 will be described below with reference to a circuit diagram of FIG. 6. This circuit is characterized in that the circuit of FIG. 4 is modified in such a manner that the feedback resistor 201 is omitted to make the differential amplifier circuit section a voltage follower circuit and that the oscillation circuit section 202 is connected to the top electrode 11 by a current detection resistor 204 having a resistance value r.

The operation of this circuit will be described below. The two input ends of the operational amplifier 200 are imaginarily short-circuited and hence the potentials of the top electrode 11 and the bottom electrode 12 can be regarded as identical. This means that the operational amplifier 200 charges and discharges the capacitance Cg at high speed without intervention of the feedback resistor 201 shown in FIG. 4. Since the top electrode 11 and the bottom electrode 12 have the same potential, the operational amplifier 200 does not charge and discharge the capacitance Co. Since the capacitance Co is not charged and discharged, the oscillation circuit 202 charges and discharges only the capacitance Cg via the current detection resistor 204.

Let Vac represent the output voltage of the oscillation circuit section 202; then, the following equations hold:

$$Ix = Vs/Zx = Vac/(r+Zx)$$

$$Vs = \{Vac/(r+Zx)\} \times Zx$$

It is seen from the above equations that when the AC impedance Zx of the capacitance Cx is varied due to seating/non-seating, the output signal voltage Vs varies accordingly. Therefore, whether a passenger is seated or not can be detected on the basis of the magnitude of the output signal voltage Vs.

Figure 4:
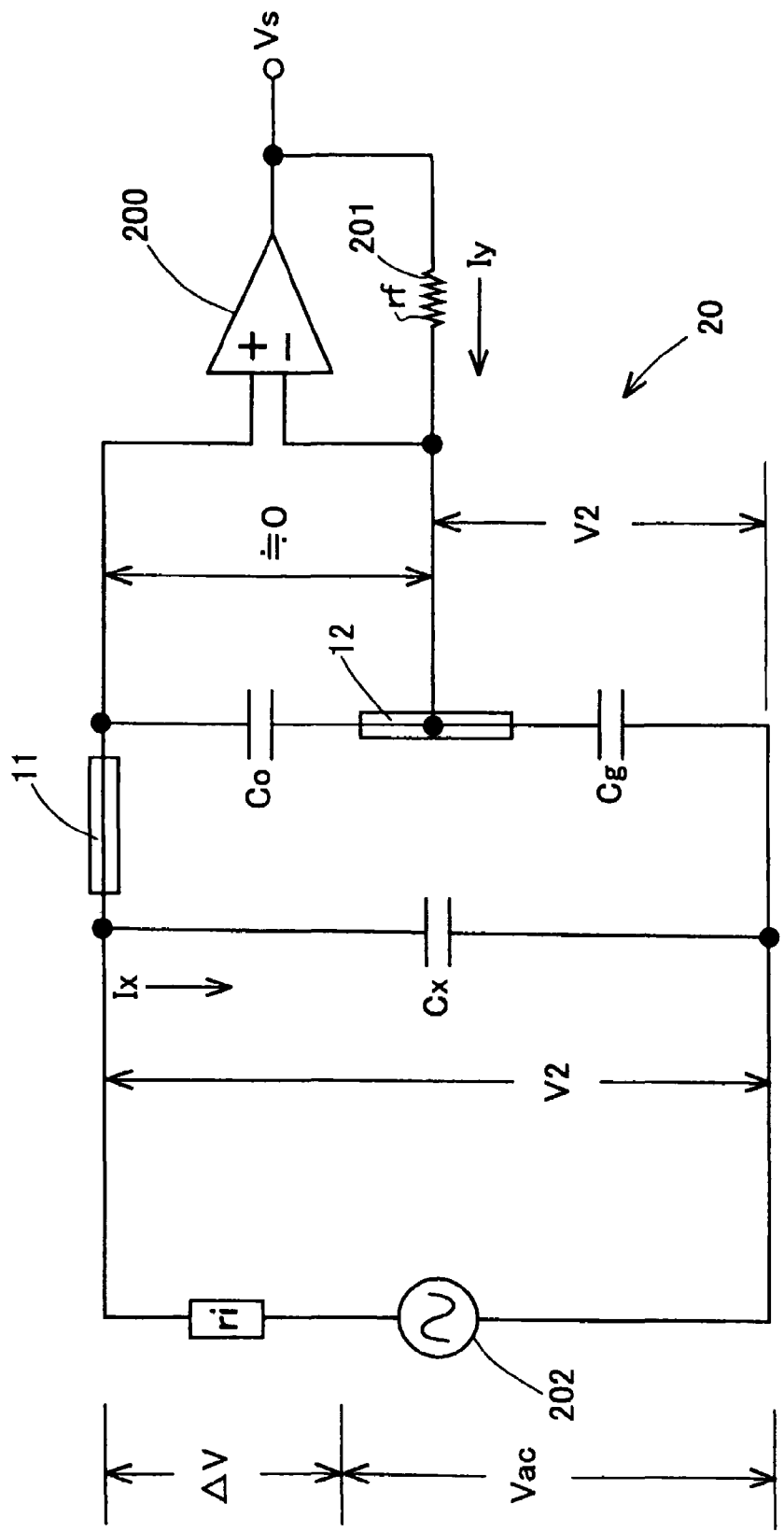
FIG. 4 is a circuit diagram of another circuit example of the detection circuit section shown in FIG. 2.
Figure 6:
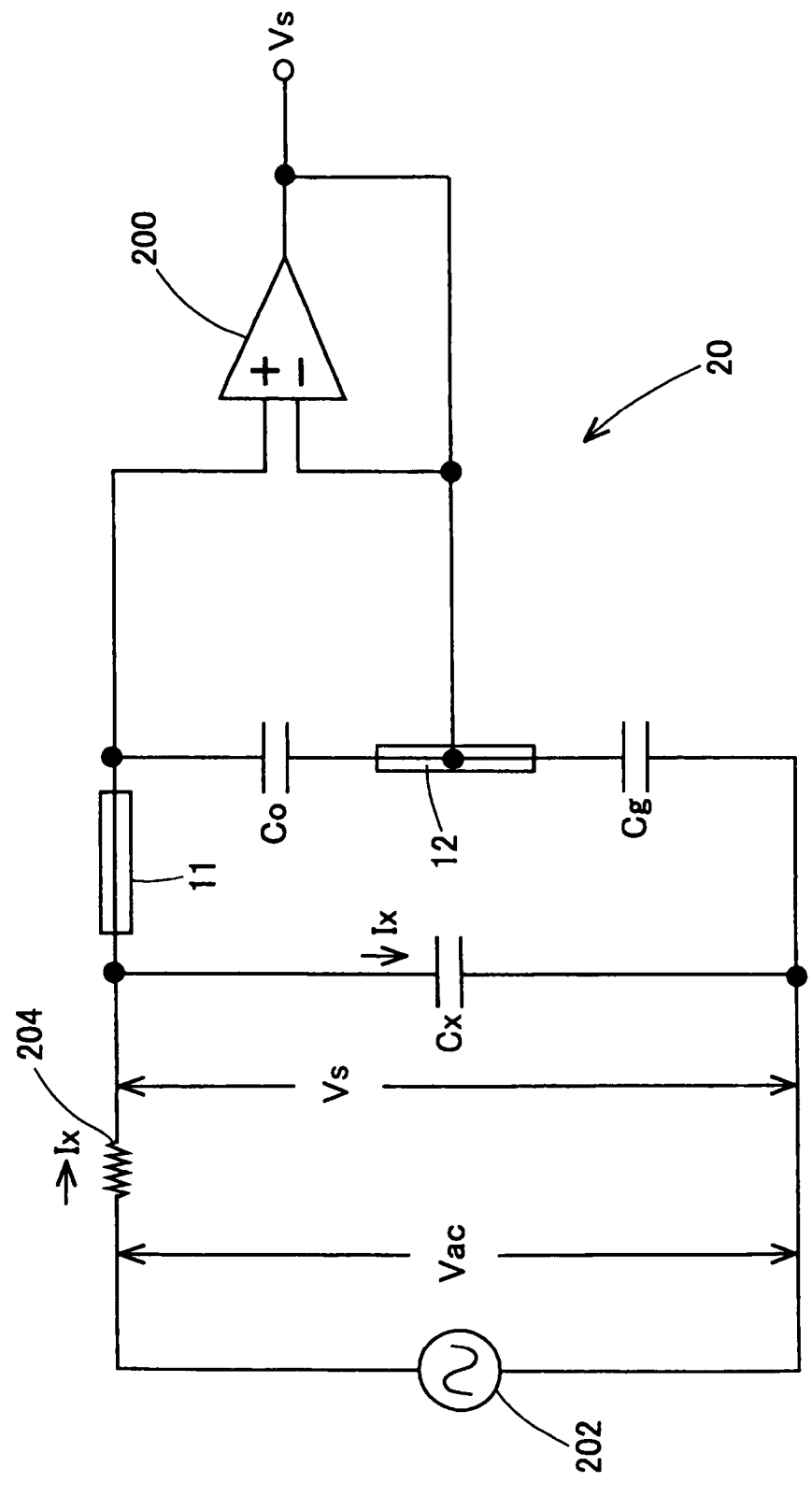
FIG. 6 is a circuit diagram of another circuit example of the detection circuit section shown in FIG. 2.

Since the feedback resistor 201 is omitted, in the circuit of FIG. 6 the voltage across the capacitance Cg can follow a variation of the AC voltage Vac better than in the circuit of FIG. 4.

Circuit example 5 of detection circuit section 20 will be explained as follows.

Circuit example 5 of the detection circuit section 20 will be described below in a specific manner with reference to a circuit diagram of FIG. 7. This circuit is characterized in that the circuit of FIG. 3 is modified in such a manner that the feedback resistor 201 is omitted to make the differential amplifier circuit section a voltage follower circuit and that the output end of the differential amplifier circuit section is connected to the top electrode 11 by a capacitor 205 having a capacitance value C1.

The operation of this circuit will be described below. The two input ends of the operational amplifier 200 are imaginarily short-circuited and hence the potentials of the top electrode 11 and the bottom electrode 12 can be regarded as identical. The output voltage of the voltage follower circuit (i.e., the differential amplifier circuit section without the feedback resistor 201) can follow a potential variation of the bottom electrode 12 with a good phase characteristic to a high frequency range. That is, the operational amplifier 200 charges and discharges the capacitances Cx and C1 at high speed without intervention of the feedback resistor 201 shown in FIG. 3. The output signal voltage Vs is taken from the top electrode 11. This is equivalent to detection of a voltage drop across the capacitor 205.

Figure 7:
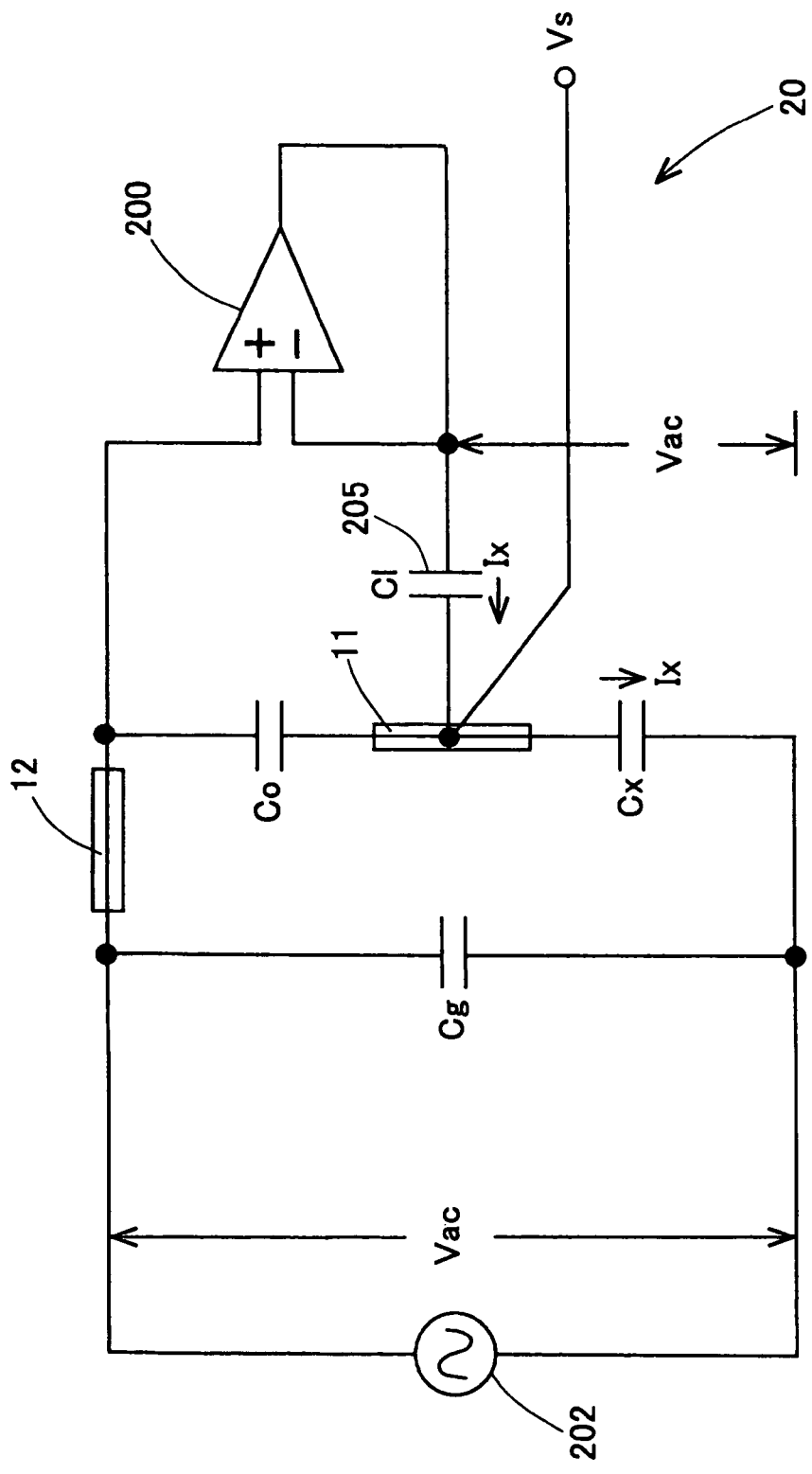
FIG. 7 is a circuit diagram of further another circuit example of the detection circuit section shown in FIG. 2.

In the circuit of FIG. 7, the following equations hold ideally:

$$Ix = Vs/Zx = Vac/(Zc1+Zx)$$

$$Vs = \{Vac/(Zc1+Zx)\} \times Zx$$

Here, Zc1 is the AC impedance of the capacitor 205. It is seen from the above equations that the output signal voltage Vs varies in link with the detection subject capacitance Cx.

Since the feedback resistor 201 is omitted, in the circuit of FIG. 7 the voltage across the capacitance Cx can follow a variation of the AC voltage Vac better than in the circuit of FIG. 3. Since the current detection impedance element is the capacitor 205, good balance is obtained between the detection subject capacitance Cx and the current detection impedance element and hence the circuit of FIG. 7 is given a superior phase characteristic. Furthermore, the circuit of FIG. 7 is superior in safety because the inverting input end of the operational amplifier 200 can be DC-insulated from the mat electrode assembly 9 by means of the capacitor 205.

Circuit example 6 of detection circuit section 20 will be explained as follows.

Figure 8:
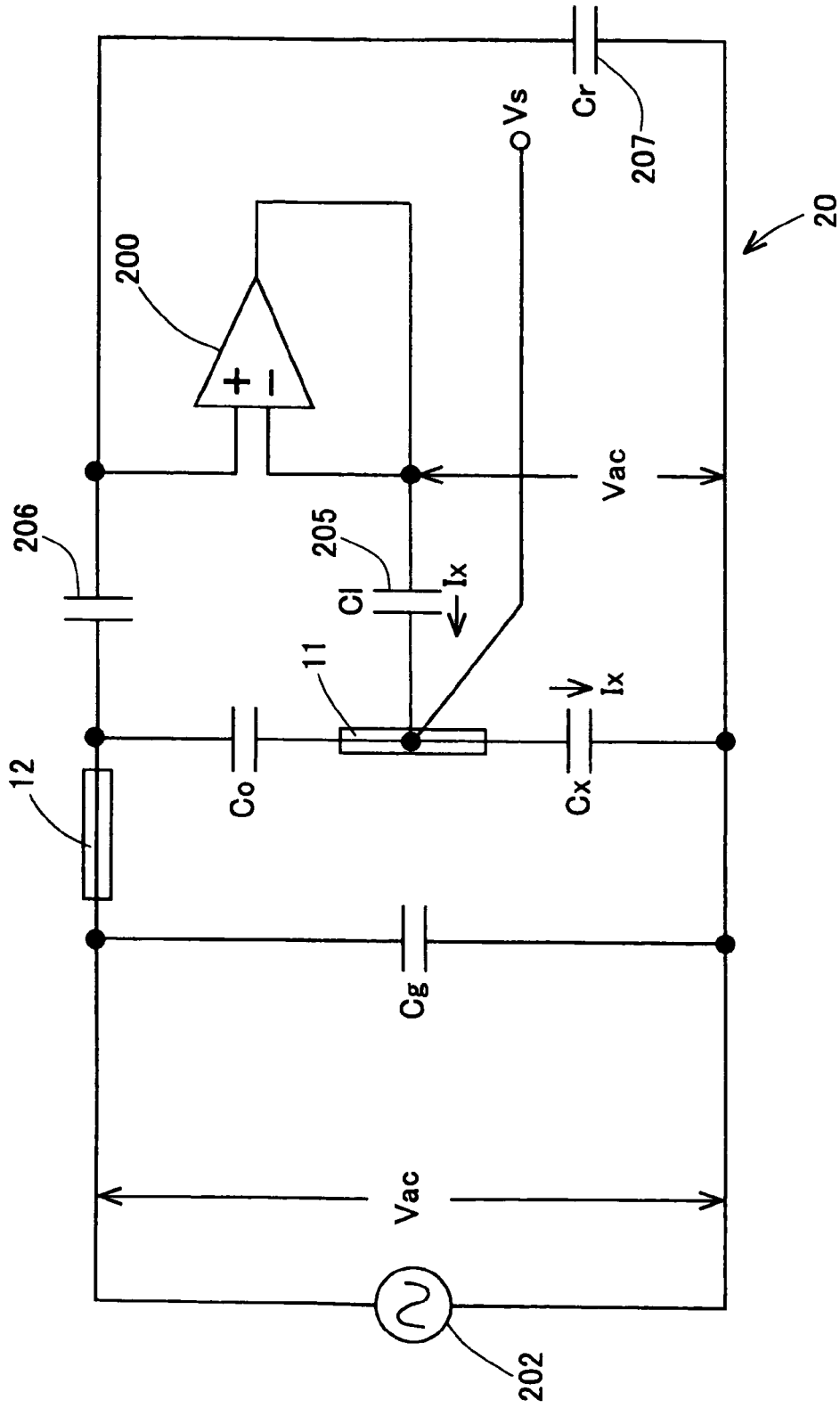
FIG. 8 is a circuit diagram of another circuit example of the detection circuit section shown in FIG. 2.

Circuit example 6 of the detection circuit section 20 will be described below with reference to a circuit diagram of FIG. 8. This circuit is such that capacitors 206 and 207 are added to the circuit of FIG. 7. The capacitor 206 is a connection capacitor which is provided between the bottom electrode 12 and the non-inverting input end of the operational amplifier 200 and which has the same capacitance as the capacitor 205. The capacitor 207 is provided between the non-inverting input end of the operational amplifier 200 and the ground and whose capacitance is set the same as the non-seating capacitance Cs of the detection subject capacitance Cx.

The operation of this circuit will be described below. The two input ends of the operational amplifier 200 are imaginarily short-circuited and hence the potentials of the top electrode 11 and the bottom electrode 12 can be regarded as identical. This means that the operational amplifier 200 charges and discharges the capacitances Cx and C1 at high speed without intervention of the feedback resistor 201 shown in FIG. 3.

The output voltage Vac' of the operational amplifier 200 is a voltage obtained by dividing the AV voltage Vac by the capacitances of the capacitors 206 and 207. Therefore, a current Ix flowing through the detection subject capacitance Cx can be detected by detecting a voltage drop across the capacitor 205. The detection subject capacitance Cx can be detected from the current Ix and a voltage drop across the capacitance Cx.

In addition to the advantages of the circuit of FIG. 7, this circuit provides an advantage that the two input ends of the operational amplifier 200 can be DC-insulated from the mat electrode assembly 9, which increases the safety of the operational amplifier 200. Furthermore, an optimum DC bias voltage can be applied to the non-inverting input end of the operational amplifier 200.

In this circuit, the potential of the top electrode 11 is not equal to that of the bottom electrode 12. However, the potential of the bottom electrode 12 varies so as to follow the potential of the top electrode 11. Also in this circuit, since the operational amplifier 200 supplies power to only the detection subject capacitance Cx, the parasitic capacitance Cg can be separated from the detection subject capacitance Cx and hence the detection sensitivity can be increased.

Circuit example 7 of detection circuit section 20 will be explained as follows.

Figure 9:
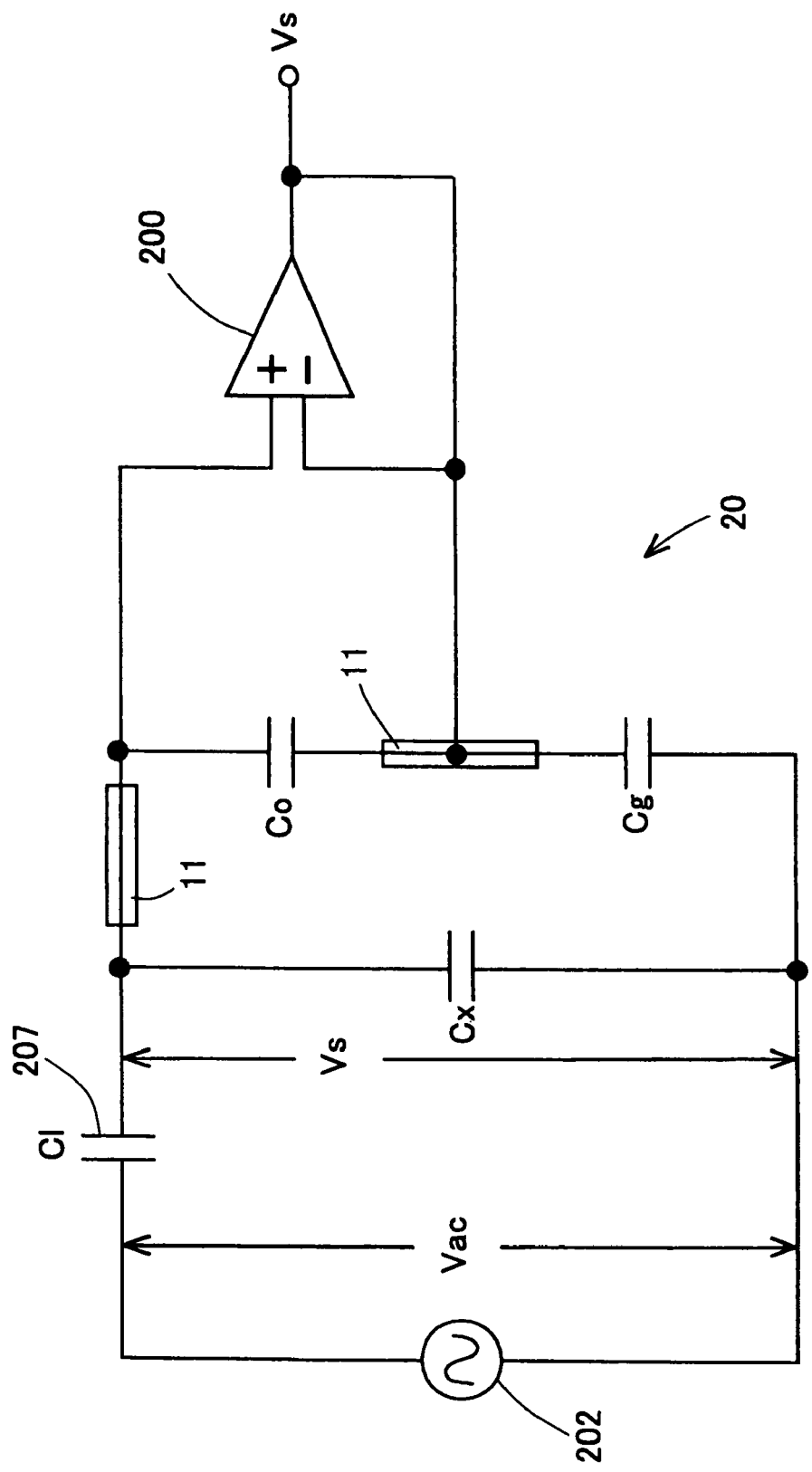
FIG. 9 is a circuit diagram of further another circuit example of the detection circuit section shown in FIG. 2.

Circuit example 7 of the detection circuit section 20 will be described below with reference to a circuit diagram of FIG. 9. This circuit is such that the circuit of FIG. 6 is modified in such a manner that the current detection resistor 204 is replaced by a capacitor 207. As a result, the output signal voltage Vs of this circuit is given a superior phase characteristic as in the circuits of FIGS. 4 and 6. Furthermore, this circuit increases the safety because the oscillation circuit section 202 is DC-separated from the mat electrode assembly 9.

Circuit example 8 of detection circuit section 20 will be explained as follows.

Figure 10:
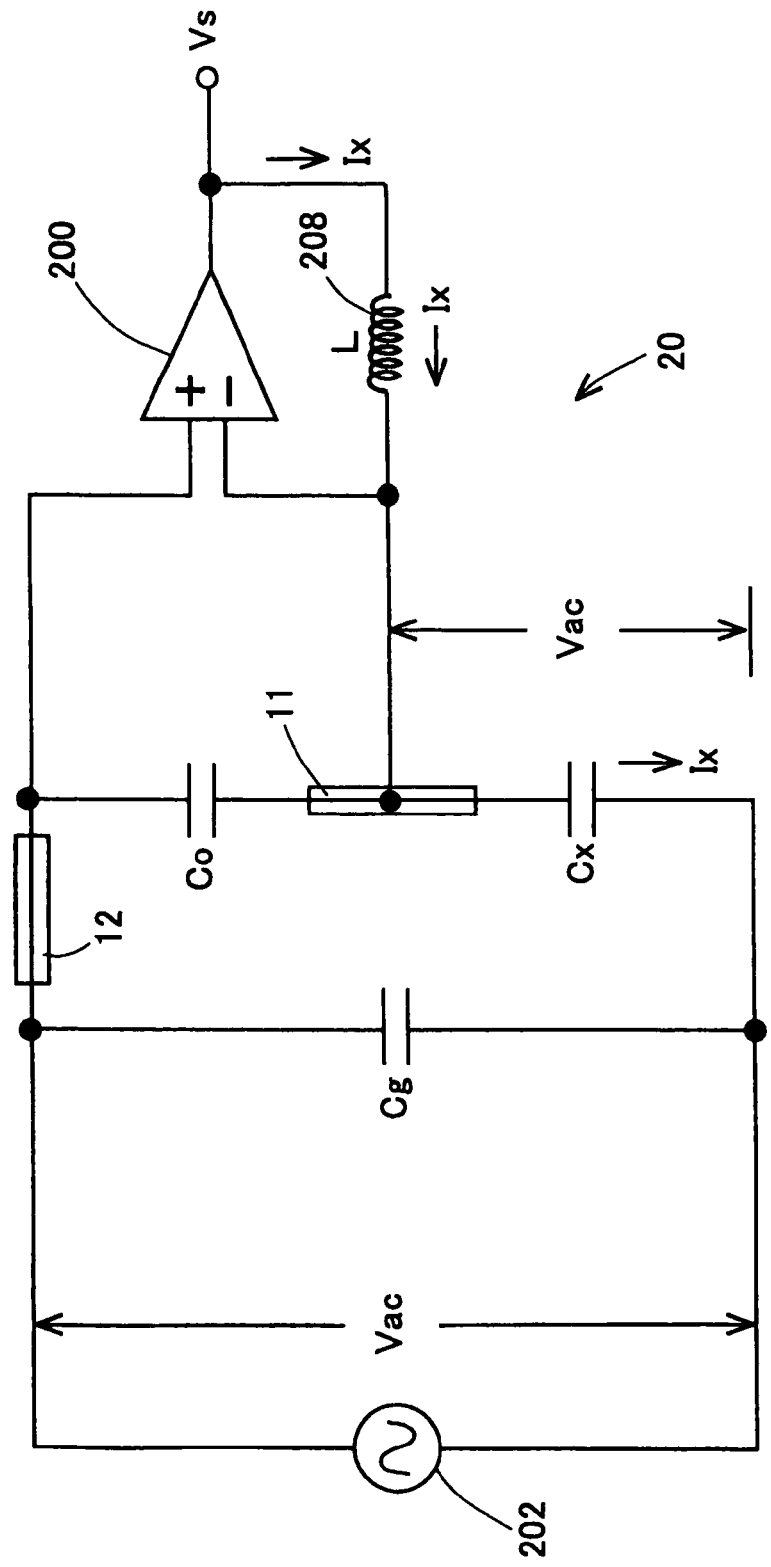
FIG. 10 is a circuit diagram of another circuit example of the detection circuit section shown in FIG. 2.

Circuit example 8 of the detection circuit section 20 will be described below with reference to a circuit diagram of FIG. 10. This circuit is such that the circuit of FIG. 3 is modified in such a manner that the feedback resistor 201 is replaced by a coil (inductance element) 208. This circuit provides the same advantages as the circuit of FIG. 3.

Circuit example 9 of detection circuit section 20 will be explained as follows.

Figure 11:
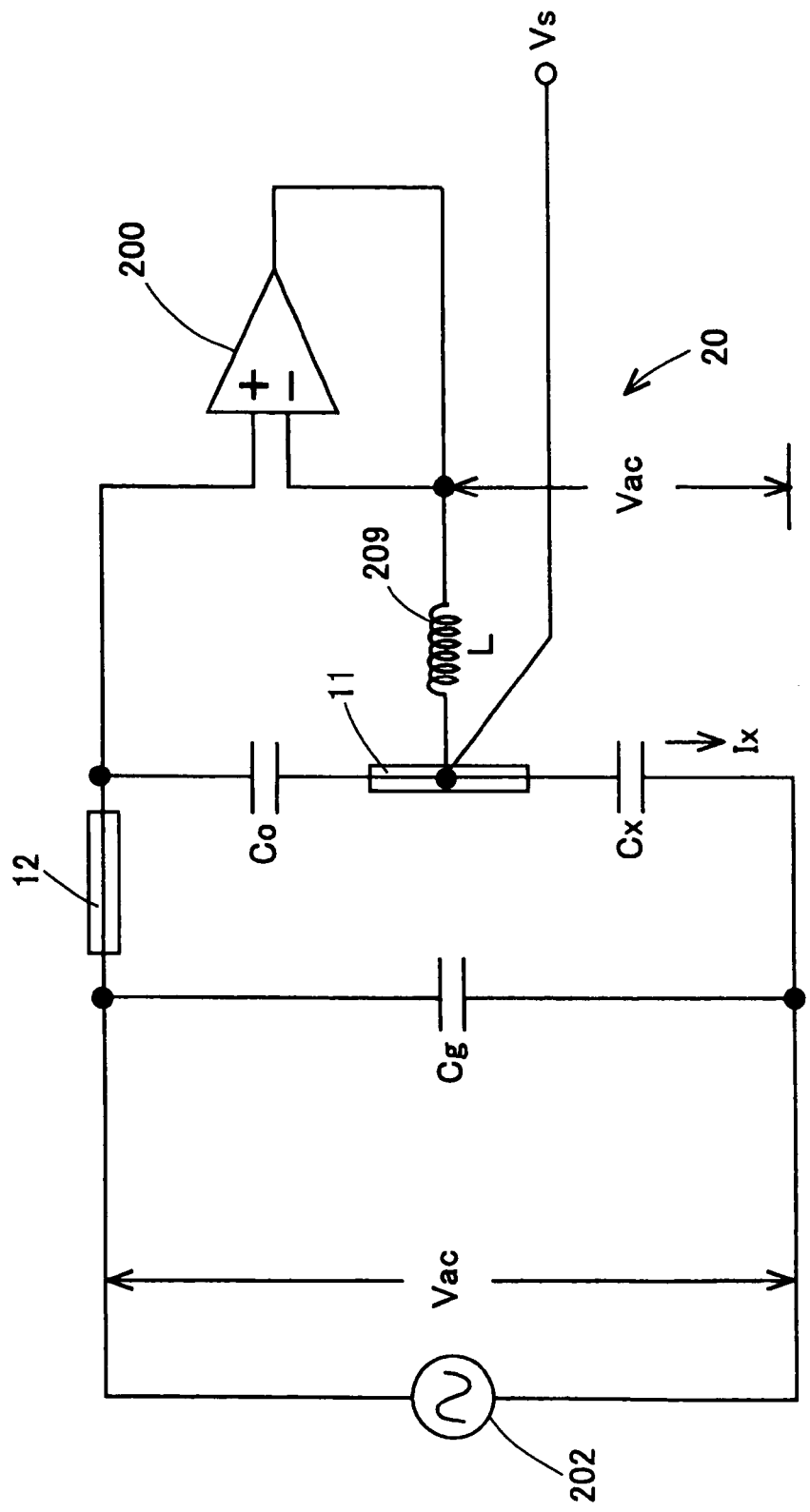
FIG. 11 is a circuit diagram of further another circuit example of the detection circuit section shown in FIG. 2.

Circuit example 9 of the detection circuit section 20 will be described below with reference to a circuit diagram of FIG. 11. This circuit is such that the circuit of FIG. 5 is modified in such a manner that the current detection resistor 203 is replaced by a coil (inductance element) 209. This circuit provides the same advantages as the circuit of FIG. 5.

Circuit example 10 of detection circuit section 20 will be explained as follows.

Figure 12:
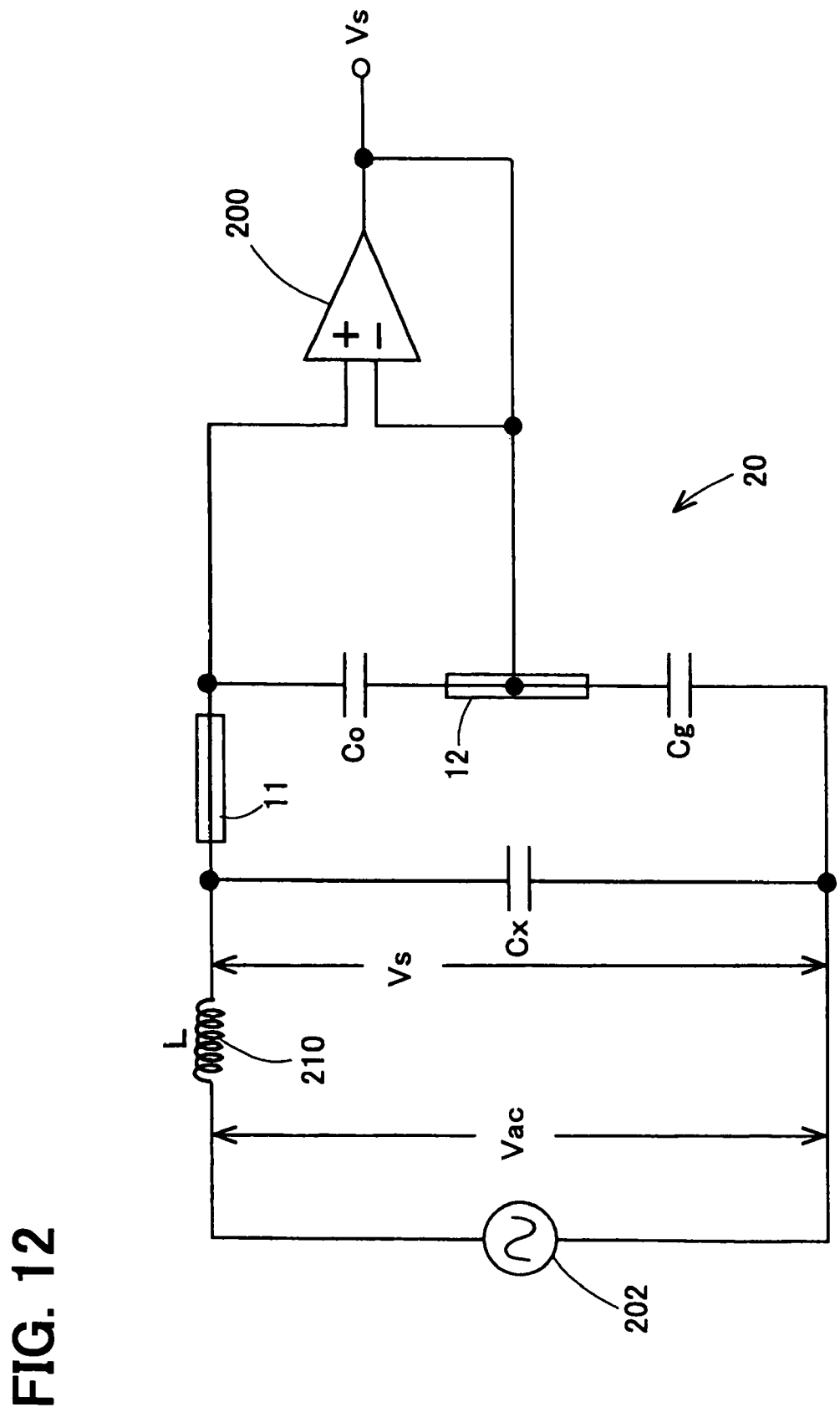
FIG. 12 is a circuit diagram of another circuit example of the detection circuit section shown in FIG. 2.

Circuit example 10 of the detection circuit section 20 will be described below with reference to a circuit diagram of FIG. 12. This circuit is such that the circuit of FIG. 6 is modified in such a manner that the current detection resistor 204 is replaced by a coil (inductance element) 210. This circuit provides the same advantages as the circuit of FIG. 6.

Circuit example 11 of detection circuit section 20 will be explained as follows.

Circuit example 11 of the detection circuit section 20 will be described below with reference to a circuit diagram of FIG. 12. This circuit is such that the oscillation circuit section 202 shown in FIG. 12 is a resonance circuit which operates at a resonance frequency of the series connection of the inductance element 210 and the combined capacitance of the mat electrode assembly 9 (i.e., the sum of the capacitance of the capacitance Cx and the combined capacitance of the series connection of the capacitances Co and Cg). That is, referring to FIG. 12, the frequency of the AC power source 202 is set equal to this series resonance frequency.

In actuality, it is not necessary to charge and discharge the capacitance Co because the capacitance Cg is charged and discharged by the voltage follower 200. Therefore, the capacitance of the mat electrode assembly 9 as seen from the oscillation circuit section 202 is equal to only the capacitance Cx of the above-mentioned combined capacitance of the mat electrode assembly 9.

Therefore, the above-mentioned series resonance frequency is proportional to the square root of the product of the detection subject capacitance Cx and the inductance L of the inductance element 210 and is varied very much due to a variation of the detection subject capacitance Cx. As a result, whether a passenger is seated or not can be detected with a steep characteristic curve by detecting a frequency variation of an amplitude variation of the output signal voltage Vs.

Electrode arrangement will be explained as follows.

Figure 13:
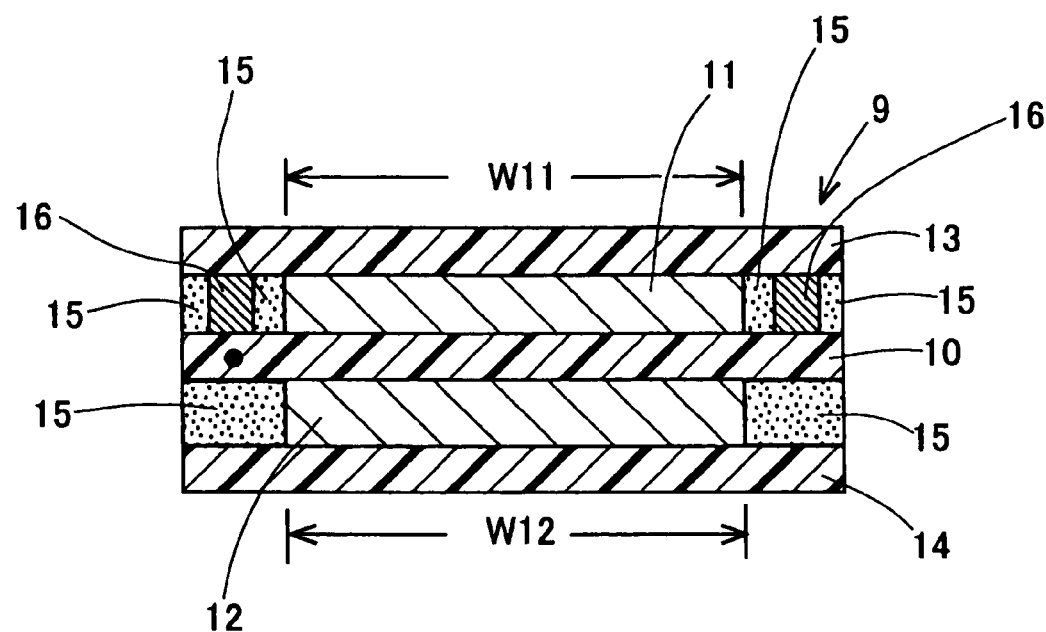
FIG. 13 is a vertical sectional view showing the electrode arrangement of a mat electrode assembly according to the embodiment.

Next, a preferred electrode arrangement of the above-described double-electrode capacitance sensor will be described with reference to FIG. 13. FIG. 13 is a sectional view, taken perpendicularly to its extending direction, of the band-like mat electrode assembly 9 of the vehicular seating sensor.

In FIG. 13, reference numeral 10 denotes a resin film; 11, a top electrode; 12, a bottom electrode; 13 and 14, cover films; 15, adhesives, and 16, water detection electrodes. The top electrode 11, the bottom electrode 12, and the water detection electrodes 16 are long in the paper thickness direction of FIG. 13 and extend in the same direction in a band-like manner.

The water detection electrodes 16 are provided on the top surface of the resin film 10 so as to be distant from the right and left ends of the top electrode 11 and to extend parallel with the top electrode 11. Each of the top electrode 11 and the bottom electrode 12 is composed of a carbon electrode layer and a silver electrode layer. However, the details of the top electrode 11 and the bottom electrode 12 will not be described because they are not important features of the embodiment. The cover film 13 covers the top electrode 11 and the water detection electrodes 16, and the cover film 14 covers the bottom electrode 12.

This electrode arrangement is characterized in that the side end faces of the top electrode 11 are located approximately at the same positions as those of the bottom electrode 12. As a result, the width W11 of the top electrode 11 is approximately equal to the width W12 of the bottom electrode 12 and the two electrodes 11 and 12 have approximately the same area. In this embodiment, the bottom electrode 12 is disposed in such a manner that no parts of it coextend with the water detection electrodes 16. The water detection electrodes 16 are electrode lines for detecting exposure to water and are given a prescribed potential (low impedance). Naturally, the same result is obtained by laying lines other than the water detection electrodes 16 at the same positions.

Figure 14:
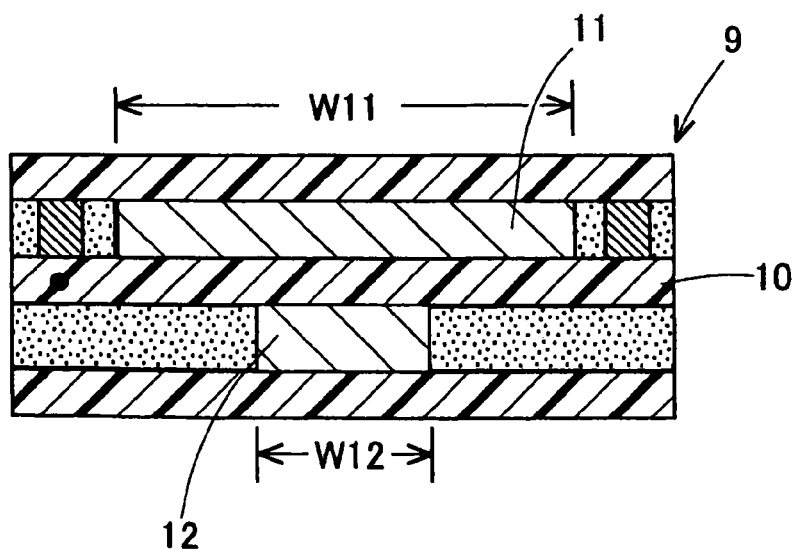
FIG. 14 is a vertical sectional view showing the electrode arrangement of a mat electrode assembly according to a related art.

It has been found that the above electrode arrangement can attain higher detection sensitivity than a comparison electrode arrangement shown in FIG. 14.

Figure 15:
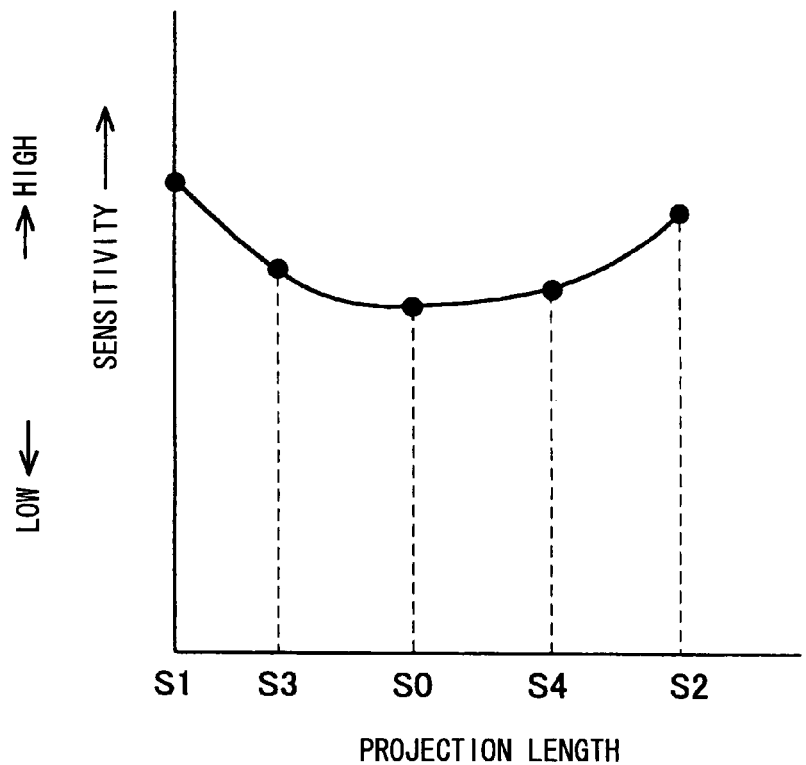
FIG. 15 is a characteristic diagram showing a relationship between the detection sensitivity and the deviation between two electrodes.

FIG. 15 is a characteristic diagram showing a relationship between the detection sensitivity and the projection length of the bottom electrode 12 from the side end faces of the top electrode 11. It has been found that the detection sensitivity can be made higher in the case where the side end faces of the two electrodes 11 and 12 are located at the same positions (S0) than in the case where their side end faces are deviated from each other (S1-S4). Symbol S1 denotes a case that W11 is greater than W12 by 20%, S2 denotes a case that W11 is shorter than W12 by 20%, S3 denotes a case that W11 is greater than W12 by 10%, S4 denotes a case that W11 is shorter than W12 by 10%.

The circuit-related aspect of the above electrode arrangement according to this embodiment will be described below.

In an AC sense, the water detection electrodes 16 can be regarded as ground electrodes like the heater 81 etc. are. Therefore, if parts of the bottom electrode 12 coextend with the water detection electrodes 16, the ground capacitance Cg of the bottom electrode 12 is increased and the sensitivity is lowered.

Next, a description will be made of the relationship between the detection sensitivity and the deviations between the two electrodes 11 and 12 in the width direction.

In the electrode arrangement of FIG. 14 which is described in the above-mentioned publication JP-A-2006-201129, the bottom electrode 12 is smaller than the top electrode 11. The double-electrode capacitance sensor is characterized in that the ground capacitance Cs of the top electrode 11 is reduced by electrostatically shielding the top electrode 11 from the ground by the bottom electrode 12, whereby the variable capacitance component Ch of the detection subject capacitance Cx is increased relatively and the detection sensitivity is increased.

When the bottom electrode 12 is smaller than the top electrode 11, parts of the major surface, not opposed to the detection subject, of the top electrode 11 are opposed to the underlying ground without intervention of the bottom electrode 12. Therefore, the capacitance Cs is large and the detection sensitivity is low.

When the bottom electrode 12 is larger than the top electrode 11, parts of the major surface, opposed to the detection subject, of the bottom electrode 12 are opposed to the detection subject (e.g., a passenger) located above without intervention of the top electrode 11. As a result, the capacitance Cg between the bottom electrode 12 and the ground varies being influenced by a seated passenger as a dielectric, that is, it varies depending on whether a passenger is seated or not. Referring to FIG. 3, if the wiring impedances and the internal resistance of the oscillation circuit section 202 are taken into consideration, a variation of the capacitance Cg causes a variation of the potential of the bottom electrode 12. This results in reduction in detection sensitivity. This problem also occurs in the circuit examples other than the circuit example of FIG. 3.

It is concluded that the detection sensitivity can be increased by locating the side end faces of the two electrodes 11 and 12 approximately at the same positions (tolerance: less than 5%) in the direction parallel with the electrode surfaces irrespective of whether or not the water detection electrodes 16 or other lines extend close to the side end faces of one of the two electrodes 11 and 12.

Vehicular passenger protection system will be explained as follows.

Figure 16:
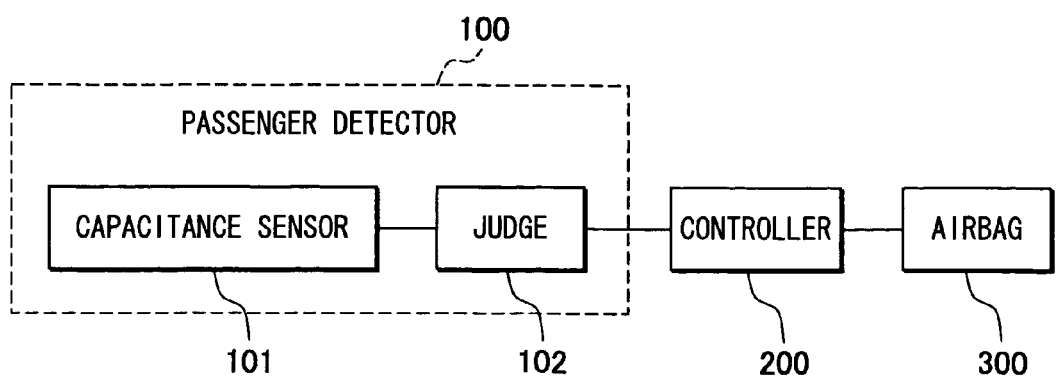
FIG. 16 is a block diagram of a vehicular passenger protection system using the double-electrode capacitance sensor according to the embodiment.

Next, a vehicular passenger protection system using the above-described double-electrode capacitance sensor will be described with reference to FIG. 16.

Reference numeral 101 denotes the above-described double-electrode capacitance sensor, which outputs an analog signal voltage that varies depending on whether or not a passenger is seated on the vehicle seat. Reference numeral 102 denotes a judgment device for judging whether a passenger is seated or not on the basis of the analog signal voltage. For example, the judgment device 102 is a comparator which compares an input analog signal voltage with a prescribed threshold voltage. The judgment device 102 can also judge, for example, the kind of seated passenger (i.e., an adult or a child) on the basis of the level of an analog signal voltage. The double-electrode capacitance sensor 101 and the judgment device 102 constitute a vehicular passenger detection apparatus 100. A judgment result, that is, a signal indicating whether a passenger is seated or not, that is output from the judgment device 102 is input to a control device 200. The control device 200 controls operation of a passenger protection apparatus 300 such as an airbag. When receiving a vehicle collision detection signal from a collision sensor (not shown), for example, the control device 200 activates the passenger protection apparatus 300 only if judging that a passenger is seated on the basis of a judgment result from the judgment device 102. Also, the control device 200 changes the operation form of the passenger protection apparatus 300 according to the build of a passenger that is judged by the judgment device 102.

As such, the vehicular passenger protection system which is composed of the vehicular passenger detection apparatus 100, the control device 200, and the passenger protection apparatus 300 exhibits superior passenger protection performance because of increased detection accuracy of the above-described double-electrode capacitance sensor 101.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A double-electrode capacitive sensor for detecting a detection object made of dielectric material, the sensor comprising:

an electrode assembly having a first electrode, a second electrode and an insulation substrate; and a detection circuit electrically coupled with the first and second electrodes, wherein the first electrode faces the detection object, the first and second electrodes are overlapped, and the second electrode is coupled with a ground, the insulation substrate has a first surface and a second surface, the first electrode is disposed on the first surface, and the second electrode is disposed on the second surface, so that the second electrode faces the first electrode in parallel to the first electrode through the insulation substrate, the detection circuit applies an alternating voltage between the ground and one of the first and second electrodes, the detection circuit detects an electric potential of the other one of the first and second electrodes, or controls the electric potential of the other one of the first and second electrodes to follow the alternating voltage of the one of the first and second electrodes, the detection circuit detects a capacitance change between the first electrode and the ground when the detection object approaches the first electrode, the detection circuit determines whether the detection object approaches the first electrode based on the capacitance change, and the second electrode has a periphery, which is substantially opposite to a periphery of the first electrode.

2. The sensor according to claim 1, wherein the electrode assembly further includes a wiring layer, which is disposed on one of the first and second surfaces of the substrate, the wiring layer is spaced apart from one of the first and second electrodes, which is disposed on the one of the first and second surfaces, and the wiring layer does not overlap with the other one of the first and second electrodes, which is disposed on the other one of the first and second surfaces.

3. A double-electrode capacitive sensor for detecting a detection object made of dielectric material, the sensor comprising:

an electrode assembly having a first electrode, a second electrode and an insulation substrate; and a detection circuit electrically coupled with the first and second electrodes, wherein the first electrode faces the detection object, the first and second electrodes are overlapped, and the second electrode is coupled with a ground, the insulation substrate has a first surface and a second surface, the first electrode is disposed on the first surface, and the second electrode is disposed on the second surface, so that the second electrode faces the first electrode in parallel to the first electrode through the insulation substrate, the detection circuit applies an alternating voltage between the ground and one of the first and second electrodes, the detection circuit detects an electric potential of the other one of the first and second electrodes, or controls the electric potential of the other one of the first and second electrodes to follow the alternating voltage of the one of the first and second electrodes, the detection circuit detects a capacitance change between the first electrode and the ground when the detection object approaches the first electrode, the detection circuit determines whether the detection object approaches the first electrode based on the capacitance change, the detection circuit includes an oscillation circuit and a differential amplifier circuit, the oscillation circuit applies the alternating voltage between the ground and the one of the first and second electrodes, the differential amplifier circuit alternatingly energizes the other one of the first and second electrodes so that the electric potential of the other one of the first and second electrodes follows the electric potential of the one of the first and second electrodes, the differential amplifier outputs a signal corresponding to an energizing current to the other one of the first and second electrodes, and the differential amplifier includes a voltage follower circuit for energizing the other one of the first and second electrodes with the electric potential of the other one of the first and second electrodes.

4. The sensor according to claim 3, wherein
the voltage follower circuit energizes the other one of the first and second electrodes through an impedance element for detecting current.

5. The sensor according to claim 3, wherein
the oscillation circuit applies the alternating voltage between the ground and the one of the first and second electrodes through an impedance element for detecting current.

6. A passenger detector comprising:
the double-electrode capacitive sensor according to claim 1, wherein
the double-electrode capacitive sensor is mounted on a seat of a vehicle,
the detection object is a passenger in the vehicle so that the detection circuit determines whether the passenger sits down on the seat based on the capacitance change, and
the detection circuit further identify the passenger based on the capacitance change.

7. A passenger protection system comprising:
the passenger detector according to claim 6;
a passenger protection device for protect the passenger in case of collision of the vehicle; and
a controller for controlling the passenger protection device based on determination of the passenger detector.

8. A double-electrode capacitive sensor for detecting a detection object made of dielectric material, the sensor comprising:
an electrode assembly having a first electrode, a second electrode and an insulation substrate; and
a detection circuit electrically coupled with the first and second electrodes, wherein
the insulation substrate has a first surface and a second surface,
the first electrode is disposed on the first surface, and the second electrode is disposed on the second surface,
the first electrode faces the detection object,
the first and second electrodes are overlapped so that a periphery of the second electrode is substantially opposite to a periphery of the first electrode,
the second electrode is coupled with a ground,
the detection circuit applies an alternating voltage between the ground and the second electrode,
the detection circuit controls an electric potential of the first electrode to follow the alternating voltage,
the detection circuit detects a capacitance change between the first electrode and the ground when the detection object approaches the first electrode,
the detection circuit determines whether the detection object approaches the first electrode based on the capacitance change,
the detection circuit includes an oscillation circuit and a differential amplifier circuit,
the oscillation circuit applies the alternating voltage between the ground and the second electrode,
the differential amplifier circuit alternatingly energizes the first electrode so that the electric potential of the first electrode follows the electric potential of the second electrode,
the differential amplifier outputs a signal corresponding to an energizing current to the first electrode,
the differential amplifier includes a voltage follower circuit for energizing the first electrode with the electric potential of the first electrode, and
a deviation between the periphery of the first electrode and the periphery of the second electrode is in a range between −10% and +10%.

* * * * *